(12) United States Patent
Hart et al.

(10) Patent No.: US 11,179,923 B2
(45) Date of Patent: Nov. 23, 2021

(54) NANO URETHANE ACRYLIC WITH PRIMER COATED ON A WOOD BOARD OR VENEER BONDED TO PVC SHEETING FOR INTERIOR AND EXTERIOR APPLICATION

(71) Applicants: Eric R. Hart, Woodburn, KY (US); James R. Knickerbocker, Nashville, TN (US)

(72) Inventors: Eric R. Hart, Woodburn, KY (US); James R. Knickerbocker, Nashville, TN (US)

(*) Notice: Subject to any disclaimer, the term of this patent is extended or adjusted under 35 U.S.C. 154(b) by 0 days.

(21) Appl. No.: 15/819,598

(22) Filed: Nov. 21, 2017

(65) Prior Publication Data

US 2019/0152207 A1    May 23, 2019

(51) Int. Cl.
B32B 27/30    (2006.01)
B32B 21/08    (2006.01)
B32B 27/40    (2006.01)
B32B 7/12     (2006.01)

(52) U.S. Cl.
CPC ........... *B32B 27/304* (2013.01); *B32B 7/12* (2013.01); *B32B 21/08* (2013.01); *B32B 27/40* (2013.01); *B32B 2264/102* (2013.01); *B32B 2266/0235* (2013.01); *B32B 2307/554* (2013.01); *B32B 2307/7145* (2013.01);
(Continued)

(58) Field of Classification Search
CPC ......... B32B 27/304; B32B 7/12; B32B 27/40; B32B 21/08; B32B 2307/7145; B32B 2264/102; B32B 2266/0235; B32B 2310/0825; B32B 2307/7246; B32B 2307/554; B32B 2471/00
See application file for complete search history.

(56) References Cited

U.S. PATENT DOCUMENTS 6,844,081 B2 *  1/2005  Hart ................. B05D 7/06
                                              427/297
7,205,052 B2 *  4/2007  Hart ................. B05D 7/08
                                              427/297
(Continued)

OTHER PUBLICATIONS

Author Unknown, BASF Tinuvin Web Page, Retrieved Jun. 17, 2019, (Learning Reference) (Year: 2019).*
(Continued)

*Primary Examiner* — Nathan L Van Sell
(74) *Attorney, Agent, or Firm* — Patterson Intellectual Property Law, P.C.; Mark A. Kilgore

(57) ABSTRACT

A composite laminate system for indoor and outdoor applications, comprising a wood layer comprised of a thin plank or veneer. An aqueous, penetrating primer is applied in a first coating to all surfaces of the wood layer, and the primer is designed to prevent and resist decay from bio attack, insects and other intrinsic bacteria, featuring antibacterial and mold inhibiting properties, including a UV inhibitor. A first aqueous nano urethane acrylic coating is applied on all surfaces of the wood layer on top of the primer coating. At least a second aqueous nano urethane acrylic coating is applied to a top surface of the wood layer on top of the first aqueous nano urethane acrylic coating. A polyvinyl chloride (PVC) foam sheeting layer is glued to the wood layer with coatings using a resin adhesive glue layer interposed between the PVC foam sheeting and the wood layer.

20 Claims, 2 Drawing Sheets

(52) U.S. Cl.
CPC ............... *B32B 2307/7246* (2013.01); *B32B 2310/0825* (2013.01); *B32B 2471/00* (2013.01)

(56) References Cited

U.S. PATENT DOCUMENTS

| | | | | |
|---|---|---|---|---|
| 2005/0260422 | A1* | 11/2005 | Hart | B05D 7/08 |
| | | | | 428/447 |
| 2009/0188559 | A1* | 7/2009 | Nesbitt | C08F 2/50 |
| | | | | 136/256 |
| 2009/0308001 | A1* | 12/2009 | Wu | E04B 1/762 |
| | | | | 52/173.3 |
| 2011/0217471 | A1* | 9/2011 | Schwendeman | C08G 18/0866 |
| | | | | 427/385.5 |
| 2012/0077890 | A1* | 3/2012 | Mancosh | C04B 16/06 |
| | | | | 521/68 |
| 2014/0311086 | A1* | 10/2014 | Braun | B32B 5/18 |
| | | | | 52/783.1 |
| 2015/0375471 | A1* | 12/2015 | Song | B32B 37/182 |
| | | | | 428/159 |
| 2016/0009944 | A1* | 1/2016 | Zhang | C08L 33/12 |
| | | | | 524/507 |
| 2017/0058537 | A1* | 3/2017 | Lombaert | B32B 3/30 |
| 2017/0356130 | A1* | 12/2017 | Guyot | E04C 2/246 |
| 2018/0044925 | A1* | 2/2018 | Koh | E04F 15/225 |

OTHER PUBLICATIONS

Author Unknowm, Preventex Technical Data Sheet, Wonderpaint, Aug. 10, 2017 (Year: 2017).*

* cited by examiner

NANO URETHANE ACRYLIC WITH PRIMER COATED ON A WOOD BOARD OR VENEER BONDED TO PVC SHEETING FOR INTERIOR AND EXTERIOR APPLICATION

CROSS-REFERENCE TO RELATED APPLICATION(S)

Not applicable

BACKGROUND OF THE INVENTION

1. Field of Invention

The present invention relates to the field of laminated composites, more particularly to laminated composite floor and wall systems.

2. Description of Related Art

Laminated, synthetic products increasingly are used to substitute for natural woods in new construction. These laminated products can be used in both exterior and interior setting as composite floor and wall systems, and they have even been seen in exterior siding.

Laminate, composite wall and floor systems can offer advantages over natural wood as far as costs and durability. However, current system can pose problems as far as microbiological resistance, delamination and separation of composite layers, warping in high humidity or prolonged exposure to water, slow production, and appearance.

Based on the foregoing, there is a need in the art a system, which will facilitate increased utility of laminated composite wood in flooring, use on interior walls, siding, and decking, and even cabinetry.

SUMMARY OF THE INVENTION

A composite laminate system for indoor and outdoor applications, comprising a wood layer comprised of a thin plank or veneer. A penetrating, aqueous primer applied in a first coating to all surfaces of the wood layer, said primer designed to prevent and resist decay from bio attack, insects, and other intrinsic bacteria, featuring antibacterial and mold inhibiting properties, including a UV inhibitor. A first aqueous nano urethane acrylic coating applied on all surfaces of the wood layer on top of the primer coating. At least a second aqueous nano urethane acrylic coating applied to a top surface of the wood layer on top of the first aqueous nano urethane acrylic coating. A polyvinyl chloride (PVC) foam sheeting layer glued to the wood layer with coatings using a resin adhesive glue layer interposed between the PVC foam sheeting and the coated wood layer.

The wood layer comprises natural wood to include oak, cherry, walnut, pine, teak, or bamboo, pressed synthetic wood composites comprised of cellulosic biomass, papers, various types of particle boards, flake boards, plastic blended recycled components, and artificial wood composites, or concrete types including Hardie Board® or flexible concrete.

The aqueous primer applied in the first coating comprises Preventex®.

The aqueous primer applied in the first coating comprises at least one of an organic, inorganic, or $TiO_2$ UV inhibitor with hindered amine light stabilizer (HALS).

The aqueous nano urethane acrylic coating exhibits at least a molecular weight of 2.6 million.

The nano urethane acrylic uses a drying and curing process comprising one or more of: a) applying infrared heating in the range of 140° F.-160° F.; b) curing at room temperature; c) applying a high-speed airflow to aid drying; and d) allowing curing time of between 2 to 24 hours after drying for full cure.

The aqueous nano urethane acrylic comprises an organic and inorganic $TiO_2$ UV inhibitor with hindered amine light stabilizer (HALS).

The nano urethane acrylic coating on the top surface of the wood layer comprises between three and fourteen coatings.

A technique for applying the coatings comprises airless spraying with 35% solids in an aqueous solution and an optional cationic charge on the sprayer gun to prevent excessive over spray.

The resin adhesive glue layer comprises polyurethane resin.

The polyurethane resin exhibits at least two of the following properties: a) elongation of 20% to 30%; b) low modulus on initial elongation with very good recovery to original position at 68° F.; c) water and moisture resistance; d) rot resistant to molds, fungi, and a plurality of bacterial attacks; and e) bonding to acrylics, acrylic nano urethanes, polyvinyl chloride, and combinations of composite to include wood, concrete, and concrete products in any combination.

The penetrating, aqueous primer first coating comprises Preventex®.

Advantages:
1. Reduces energy during manufacture and in final product.
2. High speed production.
3. Flexible application (e.g., flooring, siding, decking)
4. Cold cure system.
5. Low VOC's in aqueous solution for all three adhesive, primer and coating.
6. Superior fire resistance.

In summary, a nano urethane acrylic with primer coated on a wood board or veneer is bonded to PVC sheeting for interior and exterior applications. The present invention discloses a laminated composite flooring or wall system, and a method of manufacture thereof. The laminated composite flooring or wall system includes a layer of wood in the form of a thin plank or veneer adhered to a polyvinyl chloride (PVC) foam sheeting using a polyurethane resin (PUR). The wood is primed with a Preventex® primer and coated with a nano urethane acrylic coating (UAS nano coating). The PVC, Preventex® primer, nano urethane acrylic, and polyurethane resin adhesive are all fire retardants, and these multiple layers of fire retardant coatings provide enhanced fire resistance.

This designed nano coating for floors and siding with the ability to design for each application, such as one would find in much more expensive technologies. These polymers are economical and very efficient as well as being flexible to any substrate. They are compatible with older coating technologies such as the Preventex®. This laminate composite is designed to protect the substrate as well as the respective polymers involved in the entire composite. The aqueous system along with RTV cure or modest temperature cure saves energy and raw materials, an indirect energy savings. An option exists for UV cures as well giving even more dynamic properties. When it comes to pigmentation, the color is more color fast because the high surface area of the polymer gives excellent protection to pigment degradation or color drift. With high leaching resistance, the laminate composite provides excellent protection to the environment during its entire product life. Finally, the Preventex® primer reacts with the cellulosic portion of the wood resulting in a perfect foundational substrate for the nano coating. In addition, the coatings are breathable and intrinsically slip resistant once formulated for these essential properties.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
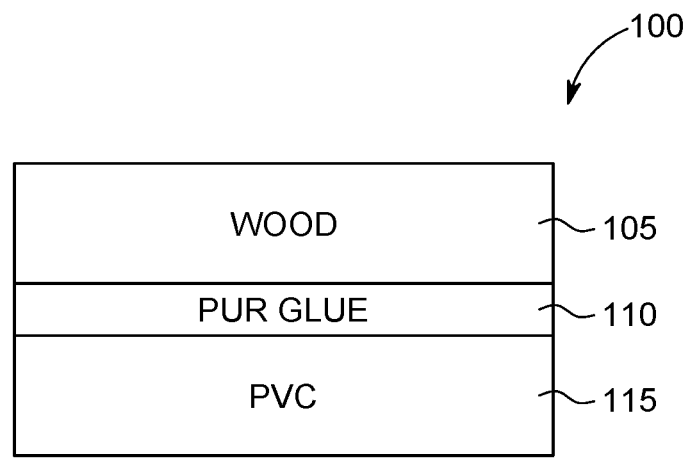
FIG. 1 is a cross section view of a prior art laminate composite system, according to an embodiment of the present invention.
Figure 2:
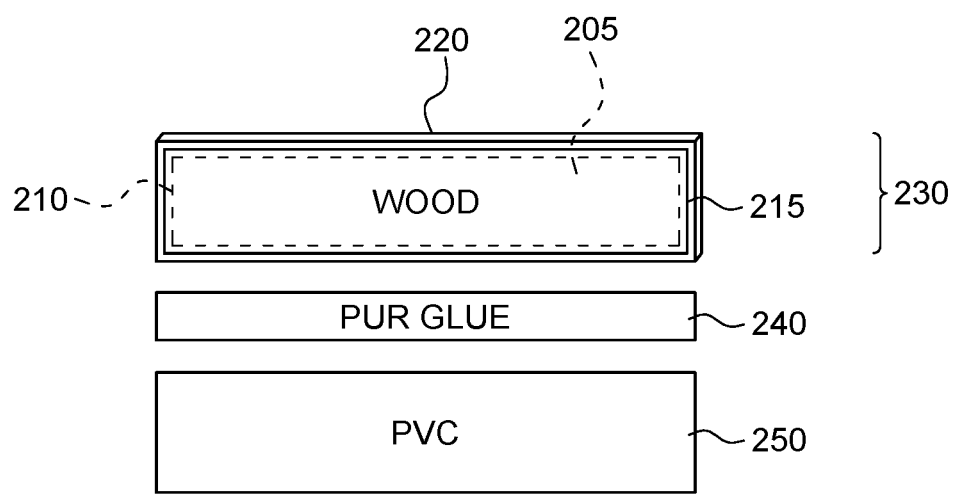
FIG. 2 is a cross section view of the laminate composite system, according to an embodiment of the present invention.
Figure 3:
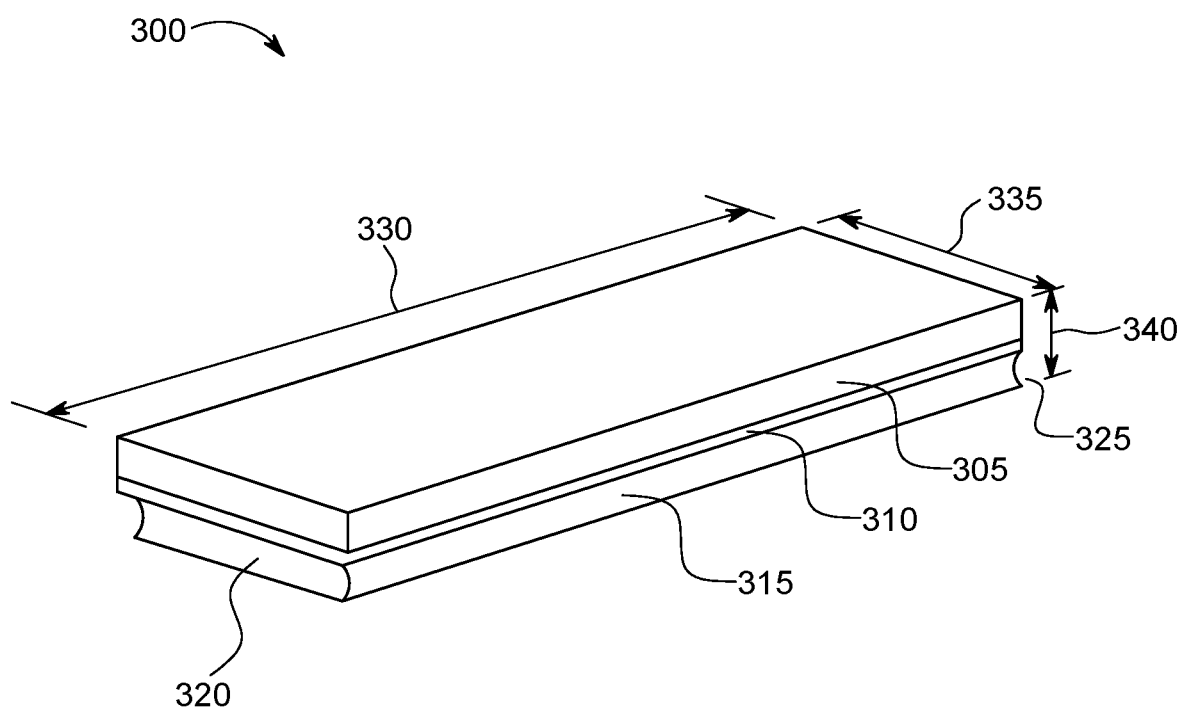
FIG. 3 is a perspective top view of the laminate composite system usable in decking, according to an embodiment of the present invention.

Preferred embodiments of the present invention and their advantages may be understood by referring to FIGS. 1-3, wherein like reference numerals refer to like elements.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable minor combination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

FIG. 1 shows a cross section view of a prior art laminate composite system 100. In the prior art system 100, a wood veneer layer 105 is bonded by a layer of glue 110 to a polyvinyl chloride (PVC) sheet 120. The glue layer 110 can comprise a polyurethane resin adhesive (PUR). The wood veneer 105 can include a surface coating of polyurethane or similar coating applied after installation. The PVC can be of a density of 0.5 to 0.6±0.10 grams/cm$^3$ thick. Such a system lacks durability, vulnerable to warping and delamination in high humidity or water immersion. These types of laminate composites can only be used in building interiors either as a wall or floor covering.

FIG. 2 shows a cross section view of the laminate composite system 200 in an embodiment. The wood veneer layer 205 can be coated by multiple layers. A first primer layer of Preventex® 210 can be applied so as to saturate the entire surface of the wood veneer 205 including the two sides, the two ends, the bottom, and the top. After drying, a layer of nano urethane acrylic coating 215 can be applied to all surfaces on top of the Preventex® layer 210. Typically, a second coat of nano urethane acrylic 220 can be applied to the top surface of the wood veneer 205. A polyurethane (PUR) glue 240 can be used to attach the coated veneer 230 to a PVC foam board 250. Additional layers of nano urethane acrylic can be applied to the top surface of the coated veneer 230.

The construction of a laminated composite flooring system or wall system for interior or exterior application is such that there are five critical components:

The wearing surface is a layer of wood in the form of a thin plank or veneer 205 with primer and coating.

The adhesive is designed specifically to have adequate elongation to accommodate the temperature expansion of the subsequent PVC sheet (oriented in the cross machine direction) that is cut to the size of the wood with an accommodating groove for a floor installation on each end and each side.

1. Wood

The wood veneer layer 205 can comprise a kiln-dried, superstrate dried to 7% EMC. All species of natural wood can used even to include oak, pine, teak, bamboo and pressed synthetic wood composites. They can consist of cellulosic biomass, papers, various types of particle boards or flake boards, plastic blended recycled components, artificial wood composites or concrete types such as Hardie Board® or flexible concrete that can all bond readily to PUR (polyurethane resin) adhesives 240 to include the above mentioned wood components.

2. Adhesive

The PUR adhesive 240 can comprise a high performance glue or adhesive with specific elongation and modulus as such when the PVC substrate expands on temperature fluctuation by plus or minus 25° F. or 12° C. The PUR adhesive 240 must have either specific or practical properties as listed:

A) Elongation of 20-30% as observed in the composite. (The adhesive by itself could have an elongation of 400% to greater than 1,000% depending upon the grade of adhesive).

B) Modulus that is low on initial elongation but with very good memory recovery to its original position at 68° F. (The cure or cross linking system must be designed to accomplish these properties).

C) Water and moisture resistance.

D) Rot and dry rot resistant to molds, fungi and various bacterial attacks. (See A thru D below).

E) Must bond to acrylics, acrylic nano urethanes, PVC and various combinations of composite that is required for flooring to include wooden sub-flooring, concrete and concrete products in any combination.

3. Polyvinyl Chloride Foam Sheeting

The PVC foam board or sheets 250 must fall within a density of 0.5–0.6+–0.1 gram/cm$^3$. This range gives the best construction and physical properties to the composite board and in addition provides the best economics for the composite laminate. The PVC foam board 250, or any oriented PVC sheet 250, gives the best results to thermal expansion when it uses the cross machine direction in the laminating process. Such is the case for PVC foam board/sheet 250 in this composite. The PVC foam board 250, or any other desired substrate, must be able to be glued to the wood, the superstrate, and to the flooring substrate to include concrete and all wooden surfaces. The PVC used must be strong enough to handle nailing when needed with a minimum of routing as needed. The foamed sheets are extruded as open or closed cell types. The origin of the PVC is virgin or recycled stocks as postconsumer or industrial.

As used herein, "PVC foam board" and "PVC sheet" are used interchangeably.

4. Preventex® Primer

The primer is a saturating type that is called Preventex®. Preventex® is covered by two active U.S. Pat. Nos. 6,844,081 and 7,205,052 B2 for use as a penetrating primer designed for wood to prevent and resist incipient decay from bio attack, insects and other intrinsic bacteria, and is noted for its antibacterial and mold inhibiting properties. Preventex® also features UV inhibitors of organic and inorganic TIO2 types with a HALS system and furthered backed up with nano zinc oxide.

Preventex® has multiple components to protect in all these situations. The patents should be reviewed for a better understanding of all the uses related to wood. Preventex® is environmentally safe. Leaching studies have shown that Preventex® does not leach into the environment, and this property was very important to the practical functioning of the coating's penetration into any wood substrate to provide an environmental friendly protective layer. Preventex® chemically locks itself on to the wood fiber. See the fore mentioned patents.

5. Nano Urethane Acrylic Coating

The UAS (urethane acrylates) nano coatings 215 and 220 are designed as a very tough and durable coating for interior and exterior areas where wood is used. The coating has multiple facets in its design to give outstanding properties as a modern coating.

The properties are as listed below:

Properties of the Primer and Nano Combination:

A) Very high molecular weight of over 2.6 million is required when placed onto the primer.
   1. The primer in this case was modified to match the nano coating described here. That is, the UV system was upgraded to include an inorganic treated UV treated $TiO_2$ for enhanced wood surface protection. In turn, this compliments the nano coating that is the final coating on the wood laminated component with the same UV system and HALS.

B) The UV protection system for the UAS nano coating uses an organic and inorganic $TiO_2$ UV protective system to give long lasting color and polymer support for the life of theproduct. The nano zinc oxide is further protection for the HALS system that is essential for clear and translucent coatings such as this UAS.

C) The UAS nano coating has a leveler and breathable system so the wood stays stable in its encapsulated state.

D) Hardness is a variable for this product so the coating can mirror the hardness of the substrate or the self-crossing mechanism can be increased with subsequent coatings up to ten times without blushing and fast curing with additional heat.

The hardness is improved or increased by high temperatures, such as infrared heat up to 140° F.-160° F. This is not a high temperature, but the cure can still be affected at room temperature as well as with high speed airflow to aid drying it. Once dried, the cure process starts and takes 2-24 hours to complete. In short, the faster the cure, the harder the surface. The cure reaches anti-block and scratch resistance very quickly as well as high toughness. If the manufacturer needs a harder finish, the finish can be adjusted before shipping by adjusting the cure time. The toughness can also be adjusted and modified to meet customer requirements.

The UAS nano coating can be applied to wood, concrete or metal with the correct formulation requirements for each substrate. In most cases, the UAS nano coating is very versatile. The molecular weight can be increased as well with core shell technology only to increase its surface area even more. The end result is high molecular weight and the higher surface area forces the percent solids to be reduced. Therefore, there should be a balance so that not so many coatings are necessary at the lower solids, resulting in a reduced time in the application process.

The best coating technique is airless spraying in the following manner with 35% solids in an aqueous solution:

1) One coat of Preventex® on all sides and ends of the wood veneer.
2) One coat of UAS nano on all sides and ends of the wood veneer.
3) Second coat of UAS nano on top side of the wood veneer only for general flooring.
4) Third coat of UAS nano for industrial or commercial surface, top side only of the wood veneer. There can be more top coats if required by the end use. Up to 14 coats can be applied to the top surface. Coatings over two or more applications can result a glass smooth finish by using good application techniques.
5) There is an option to omit the bottom coating of UAS nano if the adhesive counts as a coating to reduce nano usage.

These coatings totally encapsulate the wood component restricting moisture absorption that can lead to buckling after installation.

FIG. 3 shows a perspective top view of the laminate composite flooring system 300 usable in outdoor decking or indoor flooring applications. The laminate composite flooring system 300 comprises three main layers—1) the wood 305, 2) the PUR glue 310, and 3) the PVC foam sheet 315. The PVC foam sheet 315 includes a concave locking surface 320 in one end of the PVC foam sheet 315 and a matching convex locking surface 325 in the other end of the PVC foam sheet 315. The laminate composite flooring system 300 can have a length 330 typically from about 1½ feet to 3 feet and as much as about 6 feet long. Width 335 can be from about 4 inches to 6 inches wide and as much as about 12 inches. Total thickness 340 can range from between about 0.5 inch to 2 inches.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:

1. A composite laminate system for indoor and outdoor applications, comprising:
   a wood layer comprised of a plank or veneer;
   a penetrating, aqueous primer applied in a first coating to all surfaces of the wood layer, said primer designed to prevent and resist decay from bio attacks, insects, and other intrinsic bacteria, featuring antibacterial and mold inhibiting properties, including a UV inhibitor;
   a first aqueous urethane acrylic core shell coating having an application temperature from 140° F. to 160° F., the application temperature supplied by infrared radiation, a cure temperature from 68° F. to 77° F. and the first aqueous urethane acrylic core shell coating applied to a top surface of the wood layer on top of the primer coating;
   at least a second aqueous urethane acrylic core shell coating having an application temperature from 140° F. to 160° F., the application temperature supplied by infrared radiation, a cure temperature from 68° F. to 77° F. and the at least a second aqueous urethane acrylic core shell coating applied to a top surface of the wood layer on top of the first aqueous urethane acrylic core shell coating;
   wherein the primer applied in the first coating to all surfaces of the wood layer, the first aqueous urethane acrylic core shell coating applied to the top surface of the wood layer on top of the primer coating, and the at least a second aqueous acrylic core shell coating applied to a top surface of the wood layer on top of the first aqueous urethane acrylic core shell coating yield a coating hardness, the coating hardness substantially similar to a hardness of the wood layer; and
   a polyvinyl chloride foam sheeting layer glued to the wood layer with coatings using a resin adhesive glue layer interposed between polyvinyl chloride foam sheeting and the coated wood layer.

2. The composite laminate system for indoor and outdoor applications of claim 1, wherein the wood layer comprises natural wood including oak, pine, teak, or bamboo, pressed synthetic wood composites comprised of cellulosic biomass, papers, various types of particle boards, flake boards, plastic blended recycled components, and artificial wood composites, or concrete types or flexible concrete.

3. The composite laminate system for indoor and outdoor applications of claim 1, wherein the primer applied in the first coating comprises at least one of an organic, inorganic, or $TiO_2$ UV inhibitor with hindered amine light stabilizer.

4. The composite laminate system for indoor and outdoor applications of claim 1, wherein the urethane acrylic core shell coating exhibits at least a molecular weight of 2.6 million.

5. The composite laminate system for indoor and outdoor applications of claim 1, wherein the urethane acrylic core shell coating comprises an organic and inorganic $TiO_2$ UV inhibitor with hindered amine light stabilizer protective system.

6. The composite laminate system for indoor and outdoor applications of claim 1, wherein the urethane acrylic core shell coating on the top surface of the wood layer comprises between three and fourteen coatings.

7. The composite laminate system for indoor and outdoor applications of claim 1, wherein the resin adhesive glue layer comprises polyurethane resin.

8. A composite laminate system for indoor and outdoor applications, comprising:
    a wood layer comprised of a plank or veneer;
    a penetrating, aqueous primer applied in a first coating to all surfaces of the wood layer, said primer designed to prevent and resist decay from bio attacks, insects, and other intrinsic bacteria, featuring antibacterial and mold inhibiting properties, including a UV inhibitor;
    a first aqueous urethane acrylic core shell coating having a cure temperature from 68° F. to 77° F. and applied to a top surface of the wood layer on top of the primer coating;
    at least a second aqueous urethane acrylic core shell coating having a cure temperature from 68° F. to 77° F. and applied to a top surface of the wood layer on top of the first aqueous urethane acrylic core shell coating;
    wherein the primer applied in the first coating to all surfaces of the wood layer, the first aqueous urethane acrylic core shell coating applied to the top surface of the wood layer on top of the primer coating, and the at least a second aqueous acrylic core shell coating applied to a top surface of the wood layer on top of the first aqueous urethane acrylic core shell coating yield a coating hardness, the coating hardness substantially similar to a hardness of the wood layer; and
    a polyvinyl chloride foam sheeting layer glued to the wood layer with coatings using a polyurethane resin adhesive glue layer interposed between polyvinyl chloride foam sheeting and the coated wood layer, the polyurethane resin adhesive glue layer further exhibiting at least two of the following properties from the group consisting of: elongation of 20% to 30%; low modulus on initial elongation with a very good recovery to original position at 68° F.; water and moisture resistance; rot resistant to molds, fungi, and bacteria; and bonding to acrylics, acrylic nano urethanes, polyvinyl chloride, and composite materials including wood, concrete, and concrete products, and combinations thereof.

9. The composite laminate system for indoor and outdoor applications of claim 8, wherein the wood layer comprises natural wood including oak, pine, teak, or bamboo, pressed synthetic wood composites comprised of cellulosic biomass, papers, various types of particle boards, flake boards, plastic blended recycled components, and artificial wood composites, or concrete types or flexible concrete.

10. The composite laminate system for indoor and outdoor applications of claim 8, wherein the primer applied in the first coating comprises at least one of an organic, inorganic, or $TiO_2$ UV inhibitor with hindered amine light stabilizer.

11. The composite laminate system for indoor and outdoor applications of claim 8, wherein the urethane acrylic core shell coating exhibits at least a molecular weight of 2.6 million.

12. The composite laminate system for indoor and outdoor applications of claim 8, wherein the urethane acrylic core shell coating comprises an organic and inorganic $TiO_2$ UV inhibitor with hindered amine light stabilizer protective system.

13. The composite laminate system for indoor and outdoor applications of claim 8, wherein the urethane acrylic core shell coating on the top surface of the wood layer comprises between three and fourteen coatings.

14. A composite laminate system for indoor and outdoor applications, consisting:
    a wood layer comprised of a plank or veneer;
    a penetrating, aqueous primer applied in a first coating to all surfaces of the wood layer, said primer designed to prevent and resist decay from bio attacks, insects, and other intrinsic bacteria, featuring antibacterial and mold inhibiting properties, including a UV inhibitor;
    a first aqueous urethane acrylic core shell coating having a cure temperature from 68° F. to 77° F. and applied to a top surface of the wood layer on top of the primer coating;
    at least a second aqueous urethane acrylic core shell coating having a cure temperature from 68° F. to 77° F. and applied to a top surface of the wood layer on top of the first aqueous urethane acrylic core shell coating; and
    a polyvinyl chloride foam sheeting layer glued to the wood layer with coatings using a resin adhesive glue layer interposed between polyvinyl chloride foam sheeting and the coated wood layer.

15. The composite laminate system for indoor and outdoor applications of claim 14, wherein the urethane acrylic core shell coating exhibits at least a molecular weight of 2.6 million.

16. The composite laminate system for indoor and outdoor applications of claim 14, wherein the primer applied in the first coating comprises at least one of an organic, inorganic, or $TiO_2$ UV inhibitor with hindered amine light stabilizer.

17. The composite laminate system for indoor and outdoor applications of claim 14, wherein the urethane acrylic core shell coating comprises an organic and inorganic $TiO_2$ UV inhibitor with hindered amine light stabilizer protective system.

18. The composite laminate system for indoor and outdoor applications of claim 14, wherein the urethane acrylic core shell coating on the top surface of the wood layer comprises between three and fourteen coatings.

19. The composite laminate system for indoor and outdoor applications of claim 14, wherein the resin adhesive glue comprises polyurethane resin.

20. The composite laminate system for indoor and outdoor applications of claim 19, wherein the polyurethane resin adhesive glue layer exhibits at least two of the following properties from the group consisting of: elongation of 20% to 30%; low modulus on initial elongation with a very good recovery to original position at 68° F.; water and moisture resistance; rot resistant to molds, fungi, and bacteria; and bonding to acrylics, acrylic nano urethanes, polyvinyl chloride, and composite materials including wood, concrete, and concrete products, and combinations thereof.

* * * * *